Aug. 11, 1931.  L. M. MERSHIMER  1,818,494
LIGHTNING ROD POINT CONNECTION
Filed July 26, 1930
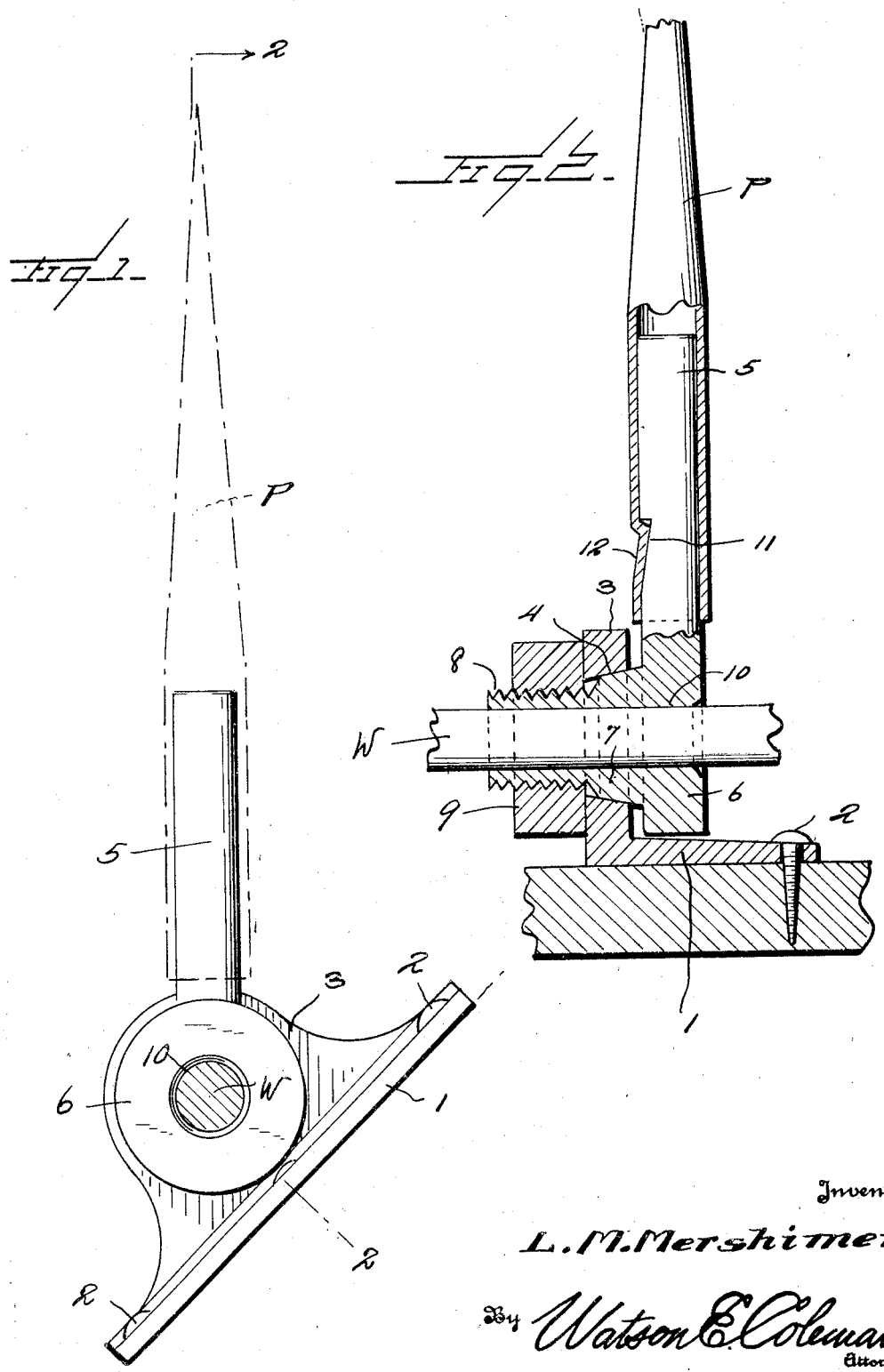
Inventor
L. M. Mershimer
By Watson E. Coleman
Attorney Patented Aug. 11, 1931

1,818,494

UNITED STATES PATENT OFFICE

LAWRENCE M. MERSHIMER, OF NEW CASTLE, PENNSYLVANIA

LIGHTNING ROD POINT CONNECTION

Application filed July 26, 1930. Serial No. 471,063.

This invention relates to a lightning rod point connection, and it is an object of the invention to provide a device of this kind whereby the applied point can be readily adjusted to a desired angle and especially with respect to the pitch of a roof.

It is also an object of the invention to provide a connection of this kind which effectively supports a lightning rod point without the necessity of a brace and which is provided with means to assure an effective contact of the wire.

The invention consists in the details of construction and in the combination and arrangement of the several parts of my improved lightning rod point connection whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation illustrating a lightning rod point connection constructed in accordance with an embodiment of my invention, an associated rod point being diagrammatically indicated by broken lines;

Figure 2 is a sectional view taken substantially on the line 2—2 of Figure 1, the rod point being shown in fragment.

As disclosed in the accompanying drawings, 1 denotes a plate adapted to be suitably anchored, as at 2, upon the roof of a building or the like. Along one marginal portion this plate 1 is provided with a perpendicularly related plate 3 through which is disposed a tapered opening 4, the larger end of which being at the inner side of the plate 3.

An elongated stem or shank 5 radiates from a head 6 provided at one side with a tapered boss 7 adapted to frictionally engage within the opening 4 through the plate 3 and which boss is continued by a threaded shank 8 upon which is adapted to be engaged a clamping nut 9. This nut 9 coacts with the outer face of the plate 3 and provides means whereby the stem or shank 5 may be effectively locked at any selective angle with respect to the plate 1. The head 6 of the stem or shank 5 has disposed therethrough an opening 10 which is also continued through the boss 7 and shank 8. This opening 10 provides means whereby the conventional wire W has proper contact with my improved connection.

The stem or shank 5 at a desired point intermediate its ends is provided with a notch or recess 11.

The stem or shank 5 is telescopically received within the tubular end portion of a lightning rod point and after which the wall of said tubular portion of the point P is dented, as at 12, or otherwise forced within the notch 11 whereby the point P is effectively held in applied position upon the stem or shank 5.

From the foregoing description it is thought to be obvious that a lightning rod point connection constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A lightning rod point connection comprising a plate having attaching means, said plate having an opening therethrough, a shank, a second shank carried by an end portion of the first named shank and extending through the opening in the plate, and means coacting with the second shank and plate for clamping the first named shank in desired selective angle with respect to the plate, said first named shank being adapted to carry a lightning rod point.

In testimony whereof I hereunto affix my signature.

LAWRENCE M. MERSHIMER.